Feb. 11, 1947.　　　R. H. CROSSLEY　　　2,415,675
SOIL DISINTEGRATING AND SIFTING SCREEN
Filed March 16, 1943　　2 Sheets-Sheet 1
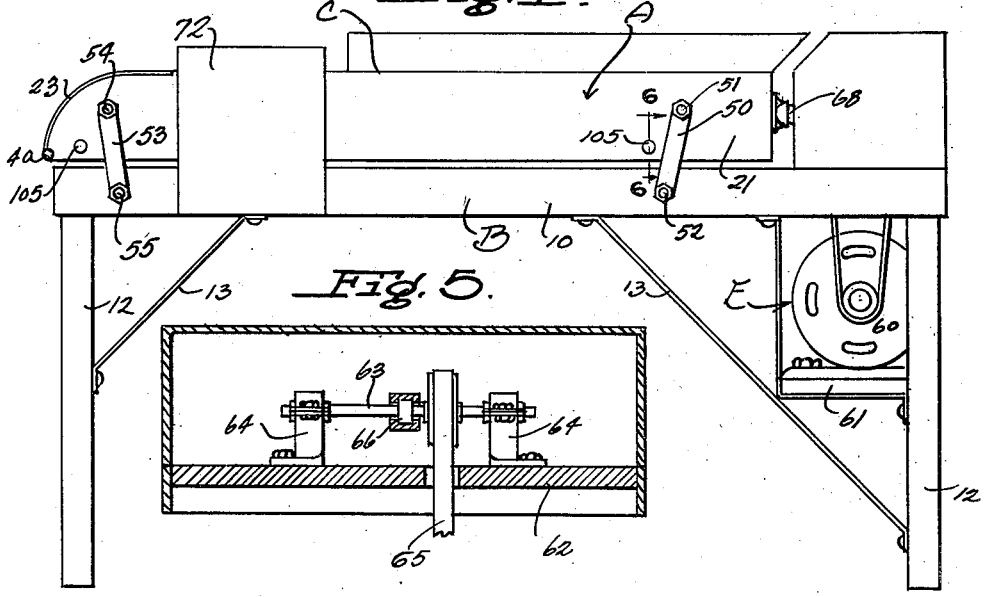
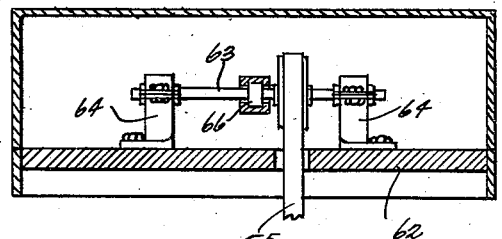
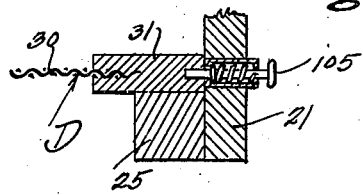
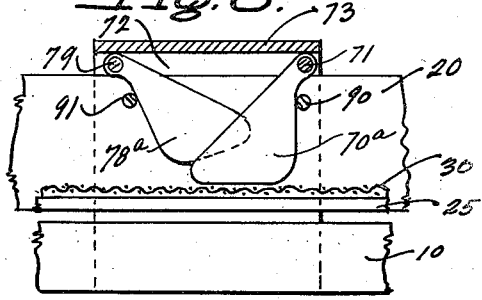
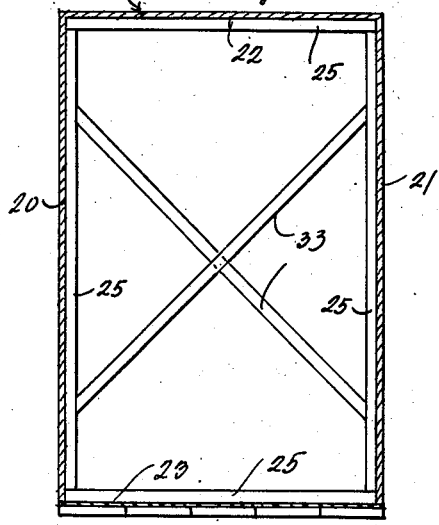
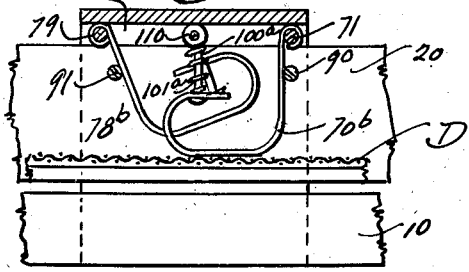
INVENTOR.
Robert H. Crossley.
BY
ATTORNEYS.

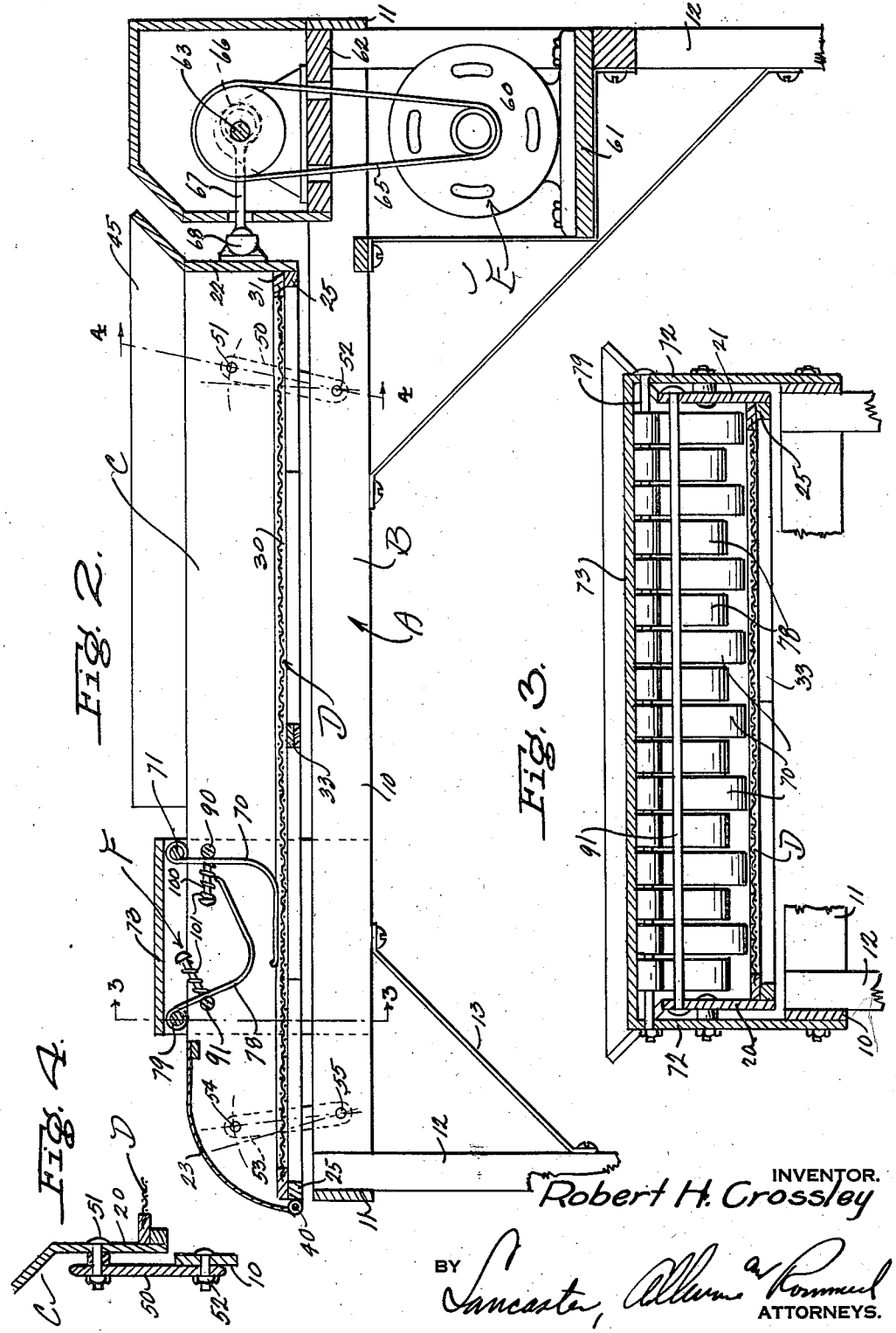
Feb. 11, 1947.   R. H. CROSSLEY   2,415,675
SOIL DISINTEGRATING AND SIFTING SCREEN
Filed March 16, 1943   2 Sheets-Sheet 2
INVENTOR.
Robert H. Crossley
BY
ATTORNEYS.

Patented Feb. 11, 1947

2,415,675

UNITED STATES PATENT OFFICE 2,415,675

SOIL DISINTEGRATING AND SIFTING SCREEN

Robert H. Crossley, Mansfield, Pa.

Application March 16, 1943, Serial No. 479,384

2 Claims. (Cl. 241—84)

This invention relates to improvements in apparatus for disintegrating and sifting materials, such as soil.

The primary object of this invention is the provision of a relatively simple and efficient type of soil sifter which is power operated for the purpose of pulverizing and sifting soil to any desired size.

Other objects and advantages of this invention will be apparent during the course of the following detailed description.

In the accompanying drawings, forming a part of this specification, and wherein similar reference characters designate corresponding parts thruout the several views, Figure 1 is a side elevation of the improved soil sifter.

Figure 2 is a fragmentary longitudinal cross sectional view taken thru the soil sifter.

Figures 3 and 4 are transverse cross sectional views taken substantially on their respective lines on Figure 2 of the drawings.

Figure 5 is a cross sectional view showing a drive connection for the power plant of the soil sifter.

Figure 6 is a fragmentary cross sectional view taken substantially on the line 6—6 of Figure 1.

Figure 7 is a fragmentary plan view showing the means of detachably supporting a screen in the sifter box.

Figures 8 and 9 are cross sectional views showing modified types of sifters.

In the drawings, wherein for the purpose of illustration are shown preferred and modified forms of the invention, the letter A may generally designate the soil sifting apparatus. It consists of the supporting frame B; shaker box C; screen D for the shaker box; drive means E for the shaker box, and soil breaking and pulverizing means F.

The framework B preferably consists of a substantially rectangular-shaped table frame consisting of longitudinal side members 10 and end members 11 supported by legs 12 in a quadrangular arrangement. The frame pieces 10 and 11 may be additionally braced upon the legs 12 by brackets 13 in any approved arrangement.

The shaker box C preferably consists of side rails or walls 20 and 21, and end walls 22 and 23. These walls are preferably provided with inside screen supporting rails 25 at the bottom of the shaker box for detachably supporting the screen D.

The screen D may of course be of any desired mesh and it consists of a screen body 30 secured to end and side rails 31, as shown in the drawings. The screen supporting rails 25 of the shaker box are additionally braced by diagonally crossed screen supporting members 33, shown in Figure 7 of the drawings.

The end wall 23 of the shaker box may be of metal and, if desired, it may be pivoted at 40 so as to provide an efficient means for preventing shaking of the earth out of the box, and for ready access to the screen C. It may be arcuated and extend from the extreme end of the shaker box up to the point of the beater mechanism F, to be subsequently described.

Sloping walls 45 may extend along the shaker box at one end and for a distance of over half the length thereof, in a funnel-shaped arrangement to permit of piling of the earth sufficiently in the shaker box and upon the screen in advance of the beater mechanism F.

It is intended to give the shaker box a reciprocatory motion. To that end, it is mounted upon the side rails 10 of the supporting framework B in a novel manner, so as to give the earth a forward movement upon the screen incident to the motion of the shaker box. Thus, the side walls 20 and 21 at their forward ends are pivotally connected to the side rails 10 of the supporting frame B by means of links 50 which are shown in detail in Figure 4 of the drawings as having pivot connections 51 and 52 with the shaker box and frame respectively. At their rear ends the walls 20 and 21 are likewise connected to the rails 10 of the frame by means of similar pivot links 53, which have pivot connections 54 and 55 with the shaker box and frame respectively. These pivot links 50 and 53 are so related that the shaker box during its forward motion is elevated slightly at its rear end and lowered slightly at its front end i. e. from a normal horizontal position. Thus the soil will be given a forward motion during reciprocation of the shaker box for the purpose of feeding it towards the beater mechanism F. To that end the link 50 may be inclined upwardly and rearwardly and the link 53 inclined upwardly and forwardly, as shown in Figures 1 and 2 of the drawings.

The driving means E preferably consists of a motor or other prime mover 60 suitably mounted at 61 upon the frame C. At the rear end the frame provides a table or wall 62 upon which a shaft 63 is rotatably mounted upon standards 64, shown in Figure 5. The shaft of the motor 60 is connected to the shaft 63 for driving the latter by means of a belt and pulley arrangement 65. The shaft 63 is provided with an eccentric 66 having a connecting rod 67 swivelly connected at 68 with the shaker box, as shown in Figure 2 of the drawings. The rapidity of shaker action of the box C of course depends upon the speed of the motor and the ratio of its drive with respect to the pulley.

The earth beating and pulverizing mechanism F is located forwardly on the shaker box, over the screen. It preferably consists of two sets of intermeshing beaters alternately operated with both the forward and rearward motions of the shaker box so as to provide an efficient and continuous beater action with an equalization of the forces placed upon the power drive. Thus, a set of preferably L-shaped metal beaters 70 are pivotally mounted upon a fixed shaft 71; the latter being supported at its ends upon uprights 72 carried by the frame rails 10, as shown in Figure 3 of the drawings. At their upper ends these uprights 72 may have a connecting wall 73 located over the beaters, which not only serves in reinforcing the mounting of the uprights 72, but also acts as a cover for preventing throwing of the soil incident to the beater and shaker action. These beaters 70 are provided with preferably flat beater feet which at one position lie parallel over the screen, as shown in Figure 2. The complimentary set of beaters 78 are shaped similar to the beaters 70 and mounted upon a shaft 79 supported similar to the shaft 71.

The side walls 20 and 21 of the shaker box are provided with beater operating rods 90 and 91 for the sets of beaters 70 and 78 respectively. These rods 90 and 91 are so positioned upon the shaker box with respect to the pivotal mounting of the beaters that the rod 90 will move the beaters 70 upwardly during forward movement of the shaker box and permit the lowering of said beaters 70 during rearward movement of the shaker box. The action of the beaters 78 is directly counter to action of the beaters 70, so that it can be seen the beating action of the beaters takes place upon the earth during both forward and rearward motions of the shaker box. In the form of beaters 70 and 78 shown in Figure 2, each beater is provided with a spring supporting pin 100 mounted upon the shaft 90 or 91, as the case may be; the spring 101 mounted thereon normally tending to urge the beater towards its respective rod 90 or 91, as the case may be. During the upward motion the action of the rods attached to the shaker box upon the beater is positive and will lift the beater. During the lowering motion of the beater, the beater need not necessarily follow the operating rods 90 or 91, since the beater will be operating upon a bulk of earth beneath the beater's foot, but the action of the spring 101 is such as to tend to move the beater foot in a tamping relation upon the earth therebeneath.

Screen D is held in place by spring operated retractable pins 105, such as shown in Figure 6 of the drawings.

The form of beater construction shown in Figure 8 includes heavy beaters or pulverizers 70ª and 78ª which swing into position for pulverizing the earth, as an incident of their weight.

In Figure 9 a further modified form of beater construction is shown consisting of beaters 70ᵇ and 78ᵇ of J-shaped formation, which are provided with a common shaft 110 having pins 100ª and springs 101ª which function at the free ends of the beaters in a manner similar to the springs 100 and 101 above described for the preferred form of beater action.

For both of the modified forms of invention shown in Figures 8 and 9, removable and immovable rods for mounting and actuating the beaters have been given the same reference characters as given for the preferred form of beater action shown in Figure 2, and their action and function are the same as for the preferred form of the invention.

The operation of the soil sifter will be apparent from the foregoing. The soil is dumped in the rear portion of the sifter box and as an incident of the reciprocatory and slight rocking action of the sifter box, the soil is moved slowly but progressively forward upon the screen until it encounters the action of the beaters. It is there acted upon for pulverizing or otherwise reducing the same to the proper size for sifting thru the screen.

Various changes in the shape, size and arrangement of parts may be made to the form of invention herein shown and described, without departing from the spirit of the invention or the scope of the following claims.

I claim:

1. In a soil disintegrator and sifting screen, the combination of a supporting frame, a movable soil sifter, including a receptacle and a screen; soil beater means pivotally mounted upon the frame and extending into said receptacle and entirely across said screen; means carried by the receptacle for actuating said beater means as an incident of movement of the receptacle relative to the frame, comprising a rigid member extending transversely across said receptacle, with said soil beater means disposed within the path of travel of said rigid member; and spring means for normally urging the soil beater means into a soil-comminuting relationship with respect to the screen and toward the rigid member.

2. In a classifying and separating device the combination of a supporting frame, a sifter receptacle movably mounted upon the frame, material engaging means cooperatively disposed within the receptacle at one end thereof for the purpose of enhancing screening action and disintegration of the material, comprising two sets of movably mounted intermeshing members, each set being mounted upon a separate pivot, the members of one set being disposed in alternating relation with the members of the other set transversely across the receptacle, and means causing one set to oscillate on its pivot in one direction while the other set oscillates on its pivot in the opposite direction.

ROBERT H. CROSSLEY.

REFERENCES CITED

The following references are of record in the file of this patent:

UNITED STATES PATENTS

| Number | Name | Date |
|---|---|---|
| 906,529 | Hyde | Dec. 15, 1908 |
| 1,286,389 | Mullen | Dec. 3, 1918 |
| 545,581 | Davidson | Sept. 3, 1895 |
| 2,020,800 | Royer | Nov. 12, 1935 |
| 1,915,539 | Kratz | June 27, 1933 |
| 670,087 | Stedman | Mar. 19, 1901 |
| 1,415,598 | Magnuson | May 9, 1922 |
| 268,762 | Williams | Dec. 5, 1882 |
| 740,194 | Smith | Sept. 29, 1903 |
| 27,191 | Lukens | Feb. 14, 1860 |